(12) United States Patent
Hon et al.

(10) Patent No.: US 8,160,737 B2
(45) Date of Patent: Apr. 17, 2012

(54) MACHINE TOOL WITH NUMERICAL CONTROLLER AND ON-MACHINE MEASURING DEVICE

(75) Inventors: Yonpyo Hon, Yamanashi (JP); Kenzo Ebihara, Yamanashi (JP); Akira Yamamoto, Yamanashi (JP); Masayuki Hamura, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 408 days.

(21) Appl. No.: 12/411,437

(22) Filed: Mar. 26, 2009

(65) Prior Publication Data
US 2009/0292503 A1 Nov. 26, 2009

(30) Foreign Application Priority Data
May 23, 2008 (JP) ................................. 2008-135789

(51) Int. Cl.
*G05B 19/18* (2006.01)
(52) U.S. Cl. ........ 700/195; 700/173; 700/176; 318/561; 451/8
(58) Field of Classification Search .................. 700/173, 700/175, 176, 195; 318/561; 451/8
See application file for complete search history.

(56) References Cited

U.S. PATENT DOCUMENTS

| | | | | |
|---|---|---|---|---|
| 3,849,712 A | * | 11/1974 | Lankford et al. | 318/561 |
| 6,729,936 B1 | * | 5/2004 | Hori et al. | 451/8 |
| 7,104,866 B2 | * | 9/2006 | Yamane et al. | 451/8 |
| 2006/0019578 A1 | * | 1/2006 | Yamane et al. | 451/8 |
| 2008/0051927 A1 | | 2/2008 | Prestidge et al. | |
| 2010/0101105 A1 | * | 4/2010 | Hon et al. | 33/503 |

FOREIGN PATENT DOCUMENTS

| | | |
|---|---|---|
| JP | 2006-021277 A | 1/2006 |
| JP | 2007-118100 A | 5/2007 |
| JP | 2007-518579 A | 7/2007 |

OTHER PUBLICATIONS

Reasons for Rejection for JP2008-135789 dated Jan. 26, 2010 (partial translation).

* cited by examiner

*Primary Examiner* — Albert Decady
*Assistant Examiner* — Douglas Lee
(74) *Attorney, Agent, or Firm* — Lowe Hauptman Ham & Berner LLP

(57) ABSTRACT

A machine tool is fitted with a position detector for detecting a position of a moving axis of the machine tool and an on-machine measuring device for measurement on the machine tool. An axial position detection signal output from the position detector and a measurement signal output from the on-machine measuring device are received through interfaces by a numerical controller that controls the machine tool. These interfaces are designed so that the numerical controller receives the axial position detection signal and the measurement signal with the same timing.

8 Claims, 8 Drawing Sheets

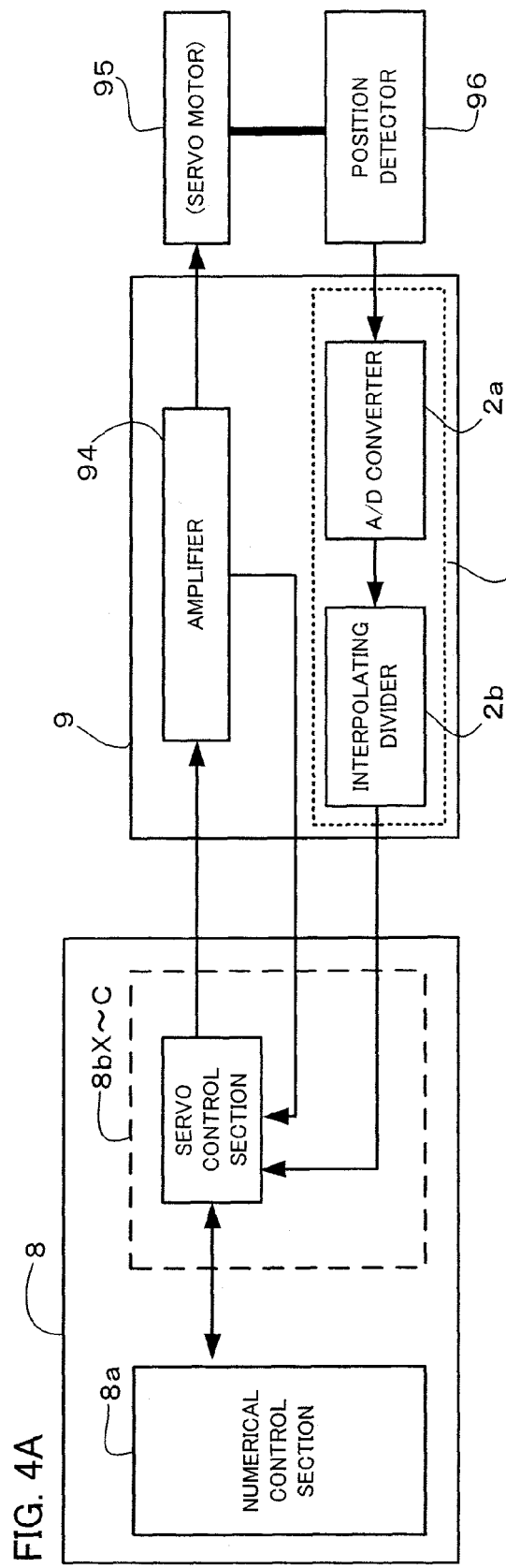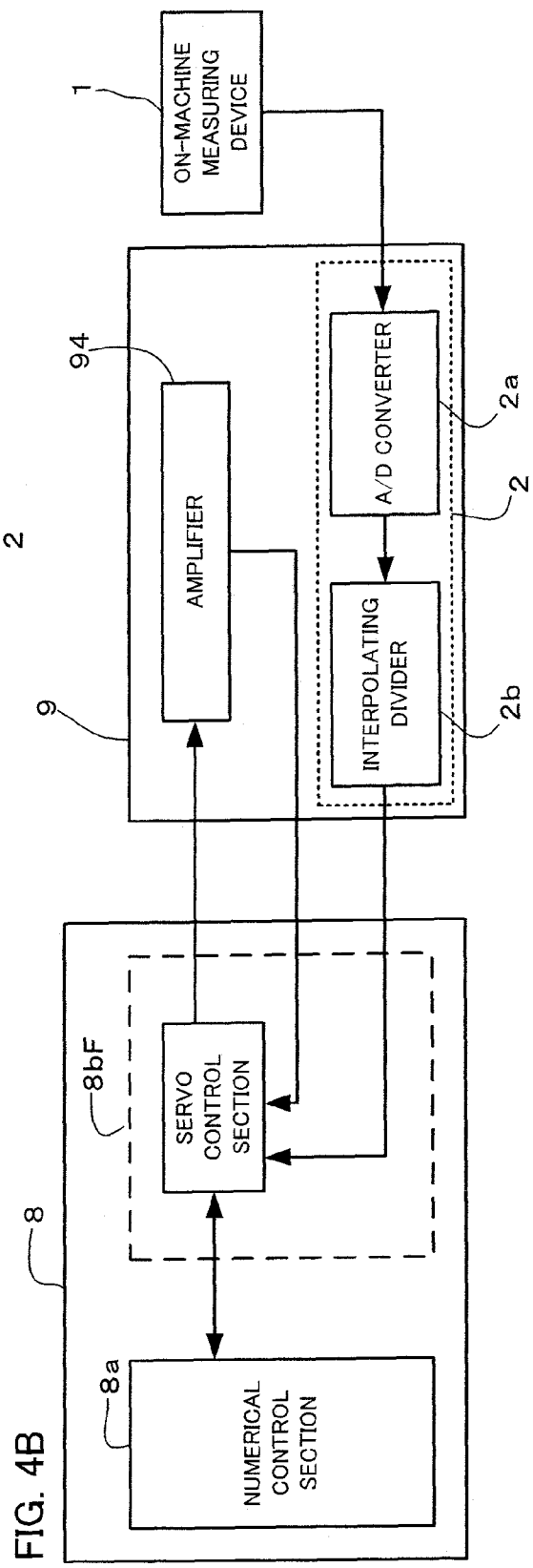

FIG. 5
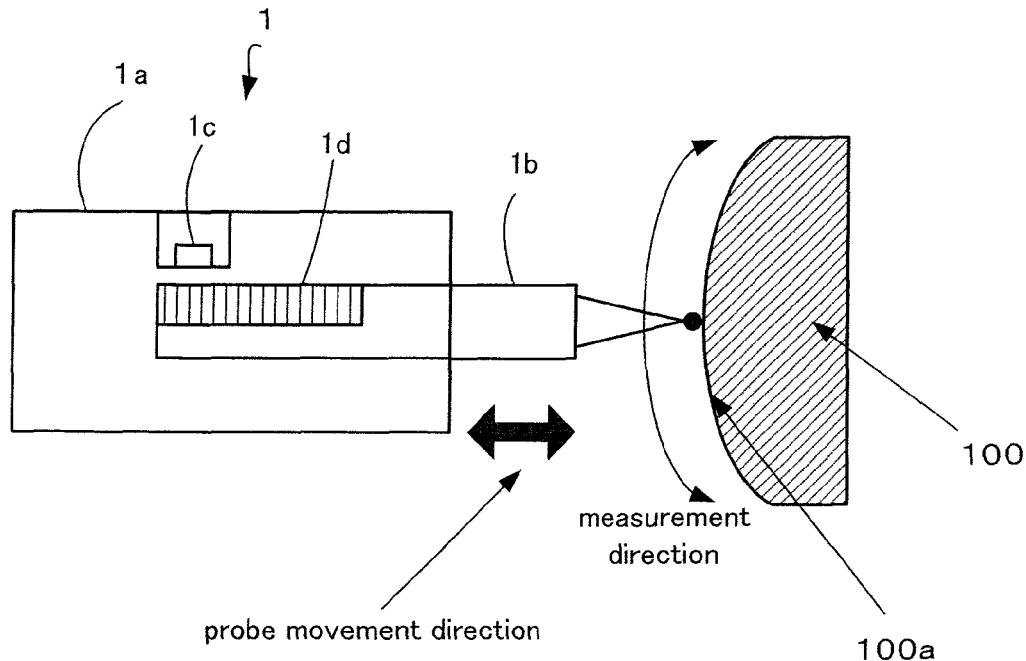
measurement direction
probe movement direction
FIG. 6
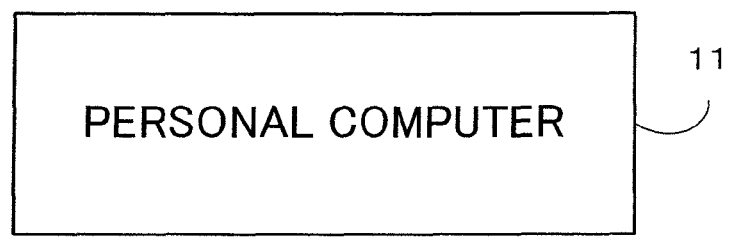
request for transfer of axial coordinate values
transfer of axial coordinate values
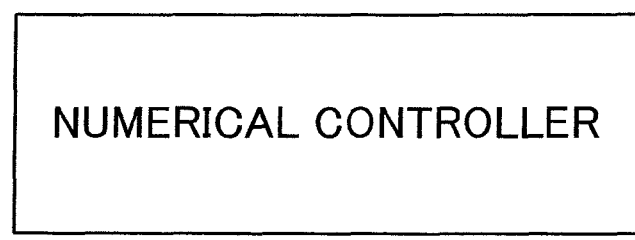

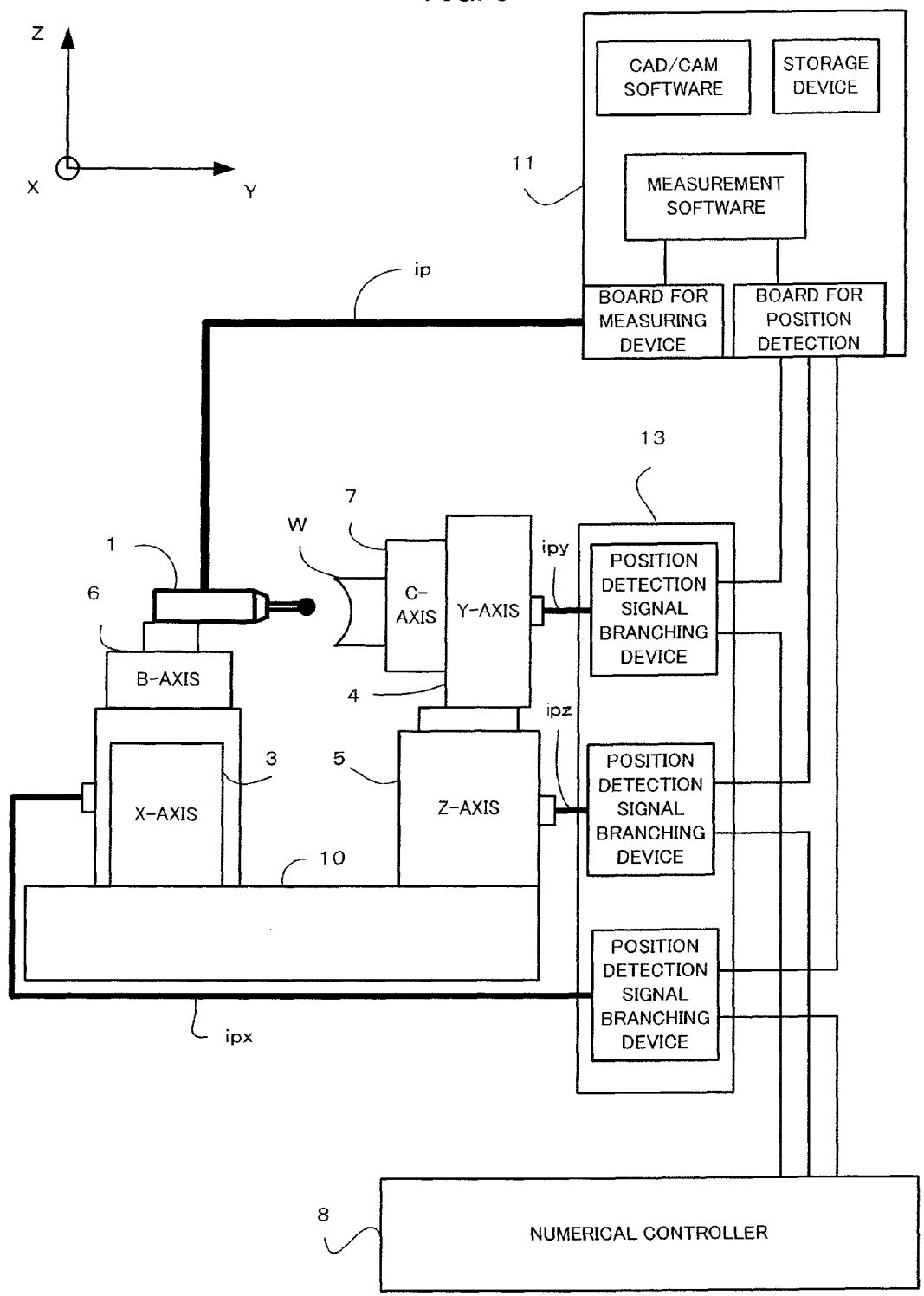

MACHINE TOOL WITH NUMERICAL CONTROLLER AND ON-MACHINE MEASURING DEVICE

RELATED APPLICATIONS

The present application is based on, and claims priority from, Japanese Application Number 2008-135789, filed May 23, 2008, the disclosure of which is hereby incorporated by reference herein in its entirety.

BACKGROUND OF THE INVENTION

1. Field of the Invention

The present invention relates to a combination of a machine tool, a numerical controller for controlling the machine tool, and an on-machine measuring device mounted on the machine tool and configured to make a measurement on the machine tool.

2. Description of the Related Art

For high-precision machining, it is very important to measure the three-dimensional shape of a workpiece on a machine tool. Conventionally, a probe-type shape measurement sensor is known to be used to measure the shape of a workpiece in such a manner that the tip of a shape probe is brought into contact with the workpiece as the three-dimensional shape of the workpiece is measured.

Japanese Patent Application Laid-Open No. 2006-21277 discloses an example of a technique in which a workpiece is measured on a machine tool that carries a shape measurer (on-machine measuring device) thereon. According to the technique disclosed in this patent document, a numerical controller simultaneously controls three axes, X-, Y- and Z-axes, of the machine tool and outputs position commands individually to servomotors for the respective axes. A probe of this on-machine measuring device includes a contact that contacts a surface of the workpiece and a laser interferometer that converts a fine displacement of the contact into a laser signal. The numerical controller is connected to a personal computer by an optical cable. The output signal of the probe that is indicative of displacement of the contact is delivered to the personal computer, in which necessary arithmetic operations for the measurement are performed. The personal computer captures position information from the numerical controller on a real-time basis.

According to the prior art technique, the signal from the on-machine measuring device is delivered to the numerical controller, and signals from the moving axes of the machine tool to the numerical controller. In this case, however, it is difficult to fetch the signal from the measuring device in synchronism with the signals from the moving axes of the machine tool into the personal computer.

In order to synchronize a signal ip from an on-machine measuring device 1 with signals ipx, ipy and ipz from position detectors for moving axes (X-, Y- and Z-axes 3, 4 and 5) of a machine tool, as shown in FIG. 9, moreover, the signals from the position detectors must be branched by means of independent signal branching devices 13 and input to a personal computer 11. These signal branching devices 13 for branching the signals from the position detectors have to be mounted as many as the moving axes required for on-machine measurement. In FIG. 9, position detectors from B- and C-axes 6 and 7, out of the moving axes of the machine tool, and branching devices for these signals are omitted. In FIG. 9, moreover, reference numerals 8 and 10 denote a numerical controller and a base of the machine tool, respectively.

However, the signal branching devices for branching the signals from the position detectors are very expensive. Also, the signal branching requires dedicated position detector substrates and more cables for them, so that complicated wire arrangement is essential. In addition, a power source is needed to supply electric power to the signal branching devices.

In order to receive the signals from the position detectors for the moving axes that are branched by the signal branching devices, moreover, the personal computer must be fitted with a dedicated signal processing board. Therefore, the computer should be provided with a mother board that has a sufficient number of slots for mounting the signal processing board so as to be congenial with the processing board.

Further, the signals from the position detectors for the moving axes of the machine tool involve pitch errors that are attributable to mounting errors and the like of the position detectors. Normally, the errors are minimized by performing pitch error correction with a numerical controller. Since the branched signals obtained by branching the signals from the position detectors with the signal branching devices are raw signals with their pitch errors uncorrected, however, data stored in the personal computer must be subjected to separate pitch error correction.

Thus, on-machine measurement with on-machine measuring device attached to a machine tool requires complicated devices and high costs, and processing the information obtained by such a measuring device entails extended time.

Corrective machining based on on-machine measurement is indispensable for machining with a high shape accuracy of nanometer order in ultra-precision machining. Therefore, a measurement signal from the on-machine measuring device and position detection signals from the position detectors for detecting the positions of the moving axes of the machine tool must be stored in a storage device of an external device, such as a personal computer, in such a manner that they are completely synchronized (i.e., as data based on the same measurement timing). In order to improve the reliability of the measurement and reduce costs, moreover, interfaces of the on-machine measuring device should be made as simple as possible.

SUMMARY OF THE INVENTION

Accordingly, the object of the present invention is to provide a machine tool provided with a numerical controller and an on-machine measuring device, in which measurement signals from the measuring device and position signals from moving axes of the machine tool need not be branched by means of position detection signal branching devices.

In a machine tool with a numerical controller and an on-machine measuring device according to a first aspect of the present invention, in order to achieve the above object, the machine tool is fitted with a position detector for detecting a position of a moving axis of the machine tool and the on-machine measuring device for measurement on the machine tool; and the numerical controller receives an axial position detection signal output from the position detector and a measurement signal output from the on-machine measuring device through interfaces. Further, these interface are designed so that the numerical controller receives the axial position detection signal and the measurement signal with the same timing. Furthermore, the numerical controller includes storage means which stores data on the axial position detection signal and the measurement signal received individually through the interfaces and transfer means which transmit the data stored in the storage means to an external device.

The interfaces may be included in amplifiers for controlling motors which drive moving axes of the machine tool. Further, the interface for receiving the measurement signal is included in one of the amplifiers which is connected to none of the motors.

Each of the interfaces may include an A/D converter which converts an analog signal output from the on-machine measuring device and the position detector into a digital signal and an interpolating divider which calculates position data within each period of the analog signal based on the digital signal output from the A/D converter and outputs digital data.

The numerical controller may be connected to a personal computer as the external device, the numerical controller transmits the data stored in the storage means to the personal computer with every predetermined period, in response to a request, if any, for data transfer with every predetermined period, and the transmitted data is loaded into a storage device in the personal computer. Furthermore, the personal computer may include shape analysis means which analyzes data on the measurement signal output from the on-machine measuring device, stored in the storage device in the personal computer, and calculates a shape of a workpiece set on the machine tool, and calculates shape error data indicative of the difference between the calculated shape of the workpiece and a reference shape of the workpiece, and the numerical controller performs corrective machining control to reduce the shape error when the shape error data output from the shape analysis means is not less than a target value, and repeatedly executes shape measurement and corrective machining so that the shape error data becomes less than the target value.

The on-machine measuring device may include therein a probe and a position detector for detecting a displacement of the probe, performs scanning with a tip of the probe in contact with an object to be measured, and measures the shape of the object to be measured by detecting the displacement of the probe.

The position detector for detecting a position of a moving axis of the machine tool or the position detector for detecting a displacement of the probe may be a linear scale, pulse coder, or laser interferometer.

In a machine tool with a numerical controller and an on-machine measuring device according to a second aspect of the present invention, moreover, the machine tool is fitted with a position detector for detecting a position of a moving axis of the machine tool and the on-machine measuring device for measurement on the machine tool, and the numerical controller receives an axial position detection signal output from the position detector and a measurement signal output from the on-machine measuring device through interfaces. Further, these interface are designed so that the numerical controller receives the axial position detection signal and the measurement signal with the same timing. Furthermore, the numerical controller includes storage means which stores data on the axial position detection signal and the measurement signal received individually through the interfaces. The machine tool further includes shape analysis means which calculates a shape of a workpiece set on the machine tool based on the data stored in the storage means and calculates shape error data indicative of the difference between the calculated shape of the workpiece and a reference shape of the workpiece. Furthermore, the numerical controller performs corrective machining control to reduce the shape error when the shape error data output from the shape analysis means is not less than a target value, and the machine tool and the on-machine measuring device repeatedly execute shape measurement and corrective machining so that the shape error becomes less than the target value.

The present invention, arranged in this manner, can provide a machine tool with a numerical controller and an on-machine measuring device, in which signals from moving axes need not be branched by means of independent position detection signal branching devices for synchronism with a signal from the measuring device.

BRIEF DESCRIPTION OF THE DRAWINGS

The above and other objects and features of the present invention will be obvious from the ensuing description of embodiments with reference to the accompanying drawings, in which:

FIG. 4A is a block diagram illustrating an interface for receiving an axial position detection signal is disposed in an amplifier unit for drivingly controlling a servomotor;

FIG. 4B is a block diagram illustrating an interface for receiving a measurement signal, which is disposed in an amplifier unit that is similar to the one shown in FIG. 4A but is not connected with any servomotor;

FIG. 5 is a diagram illustrating an on-machine measuring device which moves along a surface to be measured so as to measure the shape of the surface by the displacement of a probe;

FIG. 6 is a diagram illustrating how a numerical controller transmits axial coordinate values to a personal computer;

FIG. 9 is a schematic configuration diagram showing a prior art technique in which signals from position detectors for the moving axes are branched by using signal branching devices and input to a personal computer.

DETAILED DESCRIPTION OF THE PREFERRED EMBODIMENTS

Figure 1:
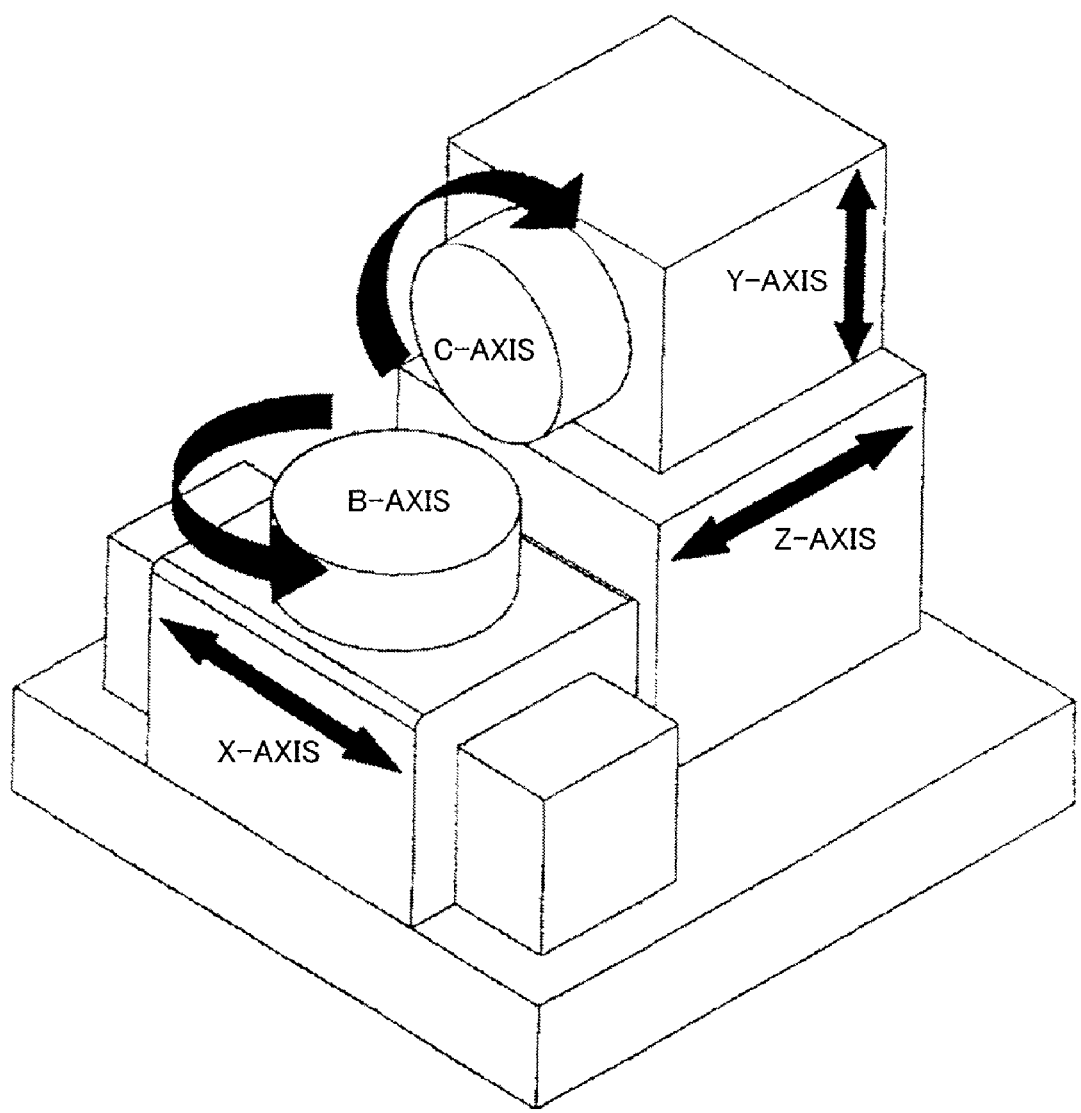
FIG. 1 shows an example of a machine tool configured to be controlled by a numerical controller and composed of moving axes including linear-drive axes (X-, Y- and Z-axes) and rotary axes (B- and C-axes)

FIG. 1 shows an example of a machine tool of which moving axes include linear-drive axes and rotary axes and which is controlled by a numerical controller. This machine tool is a five-axis machine tool that has the linear-drive axes, including X-, Y- and Z-axes, and the rotary axes, including B- and C-axes. The B- and C-axes are disposed on the X- and Y-axes, respectively.

Figure 2:
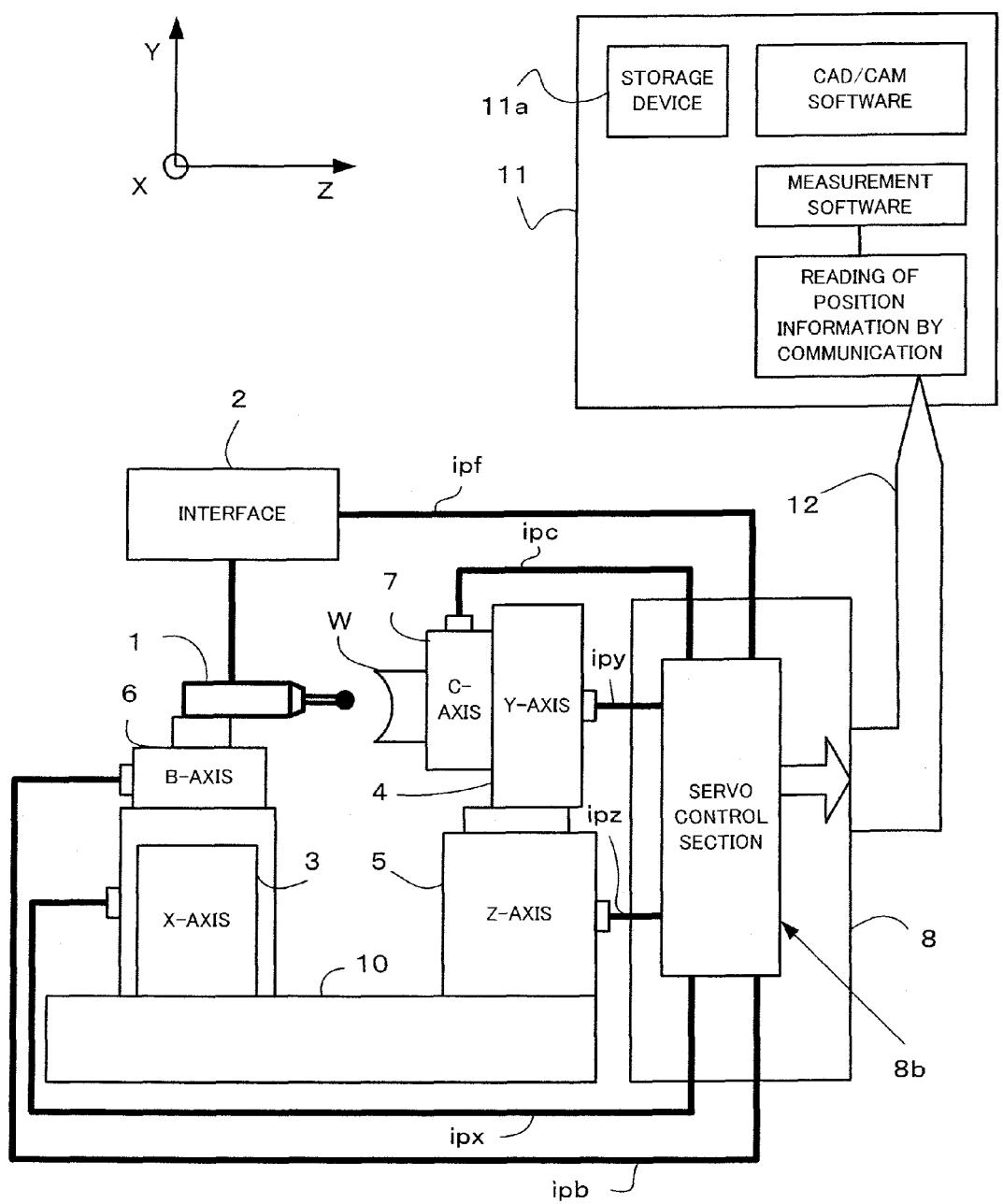
FIG. 2 is a schematic block diagram for illustrating an on-machine measuring device which is mounted on the machine tool shown in FIG. 1 and is used to make a measurement on the machine tool.

FIG. 2 is a schematic block diagram for illustrating how an on-machine measuring device 1 is mounted on the machine tool shown in FIG. 1 and used to make a measurement on the machine tool. The on-machine measuring device 1 will be described later with reference to FIG. 5.

Axial position detection signals ipx, ipy, ipz, ipb and ipc output from position detectors (not shown) that are incorporated in servomotors (not shown) for individually driving the five moving axes (X-axis 3, Y-axis 4, Z-axis 5, B-axis 6, and C-axis 7) of the machine tool are fed back through an interface (not shown) to a servo control section 8*b* of a numerical controller 8. Further, a position detection signal ipf associated with the displacement of a probe 1*b* is input from the on-machine measuring device 1 for measuring the surface shape of a workpiece W to the servo control section 8*b* through an interface 2.

The interface through which the axial position detection signals ipx, ipy, ipz, ipb and ipc from the position detectors for the individual axes are delivered to the servo control section 8*b* and the interface 2 through which the position detection signal ipf from the on-machine measuring device 1 is delivered to the servo control section 8*b* are individually configured so that the signals ipx, ipy, ipz, ipb, ipc, and ipf are synchronized as they are input to the servo control section 8*b*. For example, the interface 2 through which the position detection signal ipf from the on-machine measuring device 1 is delivered to the servo control section 8*b* is formed having the same circuit configuration as that of the interface through which the axial position detection signals from the position detectors for the individual axes are delivered to the servo control section 8*b*. The configurations of these interfaces will be described later with reference to FIGS. 4A and 4B.

Further, the numerical controller 8 is provided with storage means (not shown) and an interface (not shown). The storage means stores position information for the moving axes of the machine tool and measurement information (e.g., position information) from the on-machine measuring device 1. The position information stored in the storage means is delivered to a personal computer 11 through the interface.

The axial position detection signals which are feedback signals from the moving axes of the machine tool and a measurement signal from the on-machine measuring device 1 are input to the servo control section 8*b* of the numerical controller 8 through the interfaces of the same circuit configuration, as mentioned before. In consequence, the axial position detection signals for the individual axes output from the position detectors and the position detection signal (measurement signal) output from the on-machine measuring device 1 are synchronously input to the numerical controller 8, and loaded as position information into the storage means (not shown) of the numerical controller 8.

Furthermore, the numerical controller 8 performs LAN communication with the personal computer 11 which is an external device via an Ethernet (trademark) network 12, thereby delivering the position information (axial position detection signals) for the individual axes and the position information (measurement signal) from the on-machine measuring device 1 to a storage device 11*a* that is connected to or incorporated in the personal computer 11. The personal computer 11 stores the storage device 11*a* synchronously with the position information from the axes 3 to 7 and the position information from the on-machine measuring device 1 for each sampling period.

The personal computer 11 is loaded with measurement software and executes required arithmetic processing such as workpiece shape measurement, based on the position information read by means of the numerical controller 8. This shape measurement or other arithmetic processing is performed in a conventional manner.

In the example shown in FIG. 2, the position information is transferred from the numerical controller 8 to the external personal computer 11. Alternatively, the capacity of an internal storage device of the numerical controller 8 may be made large enough also to accommodate CAD/CAM software. If this is done, processes for machining, shape measurement, and shape analysis, which will be described later, can be unified and executed within the numerical controller 8 without using any external device.

Figure 3:
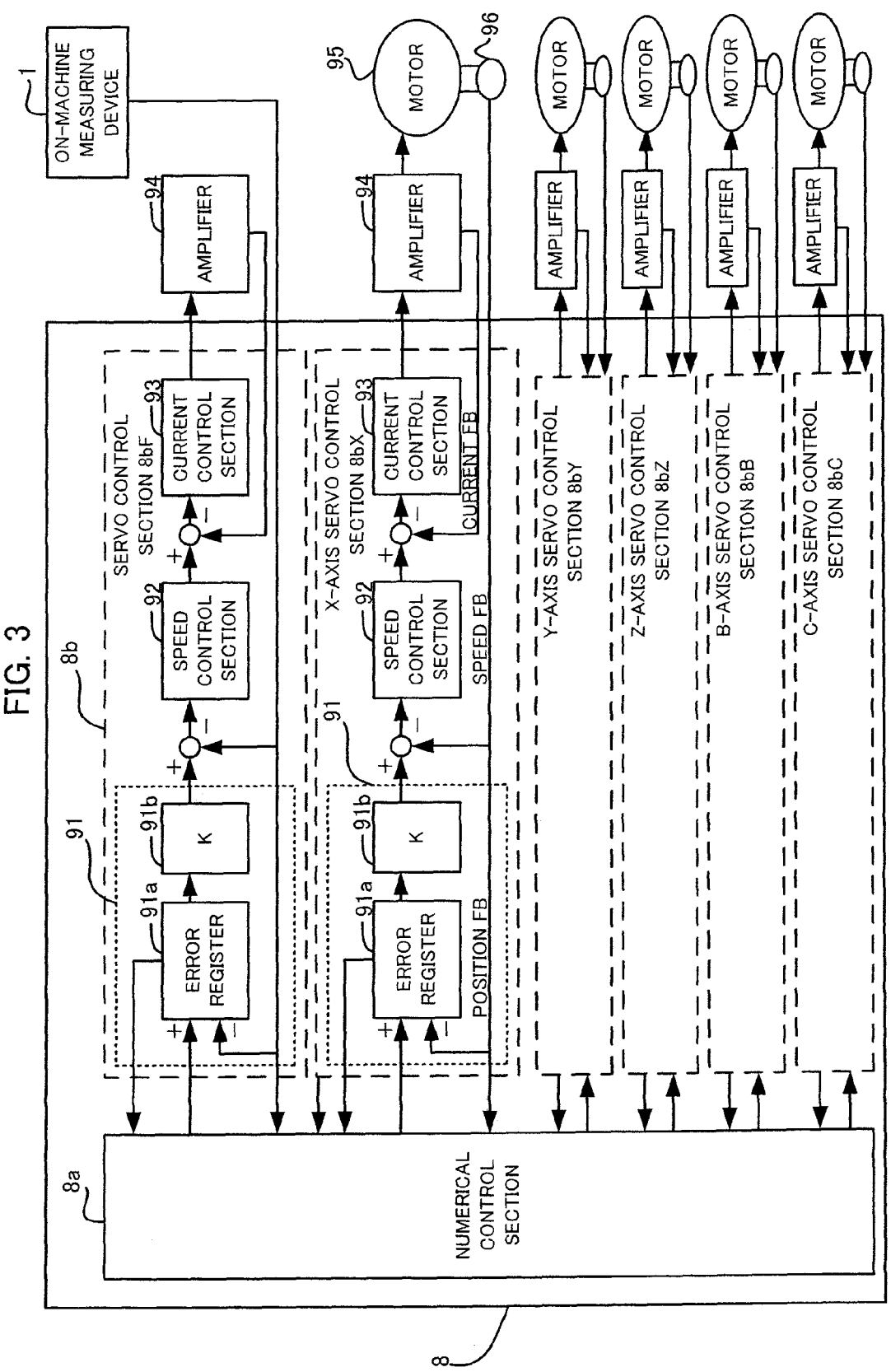
FIG. 3 is a diagram showing axes of the machine tool of FIG. 2 which are feedback-controlled by the numerical controller and the on-machine measuring device which is connected to the numerical controller.

FIG. 3 is a diagram showing how the moving axes, that is, the X-, Y-, Z-, B-, and C-axes, of the machine tool shown in FIG. 2 are subjected to position, speed, and current feedback controls by servo control sections 8*b*X, 8*b*Y, 8*b*Z, 8*b*B and 8*b*C of the numerical controller 8. These feedback controls are conventional ones that are normally performed by numerical controllers that control machine tools. Since these controls are common to the individual axes, only the X-axis servo control section 8*b*X will be described hereinafter.

The X-axis servo control section 8*b*X is composed of a position control section 91 for position loop control, a speed control section 92 for speed loop control, and a current control section 93 for current loop control. The position control section 91 includes an error register 91*a* and an amplifier 91*b* for a position loop gain K. The position control section 91 receives a move command from a numerical control section 8*a*, calculates a position deviation by subtracting a position feedback (position FB) from the move command, and outputs a speed command obtained based on the position deviation to the speed control section 92. As shown in FIG. 3, the position deviation is calculated by means of the error register 91*a*. The position deviation calculated by the error register 91*a* is also output to the numerical control section 8*a*.

Based on a speed deviation obtained by subtracting a speed feedback (speed FB) from the speed command, the speed control section 92 performs speed loop control to obtain a current command. The current command is output to the current control section 93. The current control section 93 performs current loop control, based on a current deviation obtained by subtracting from the current command a current feedback (current FB) from a current sensor (not shown) for detecting a current that flows through a servomotor 95. The current sensor is incorporated in an amplifier 94. The servomotor 95 is a drive means for driving the X-axis, and is fitted with a detector (hereinafter referred to as the "position detector") 96 for detecting its position and speed. A position feedback (position FB) from the position detector 96 is fed back to the position control section 91 and a speed feedback (speed FB) is fed back to the speed control section 92.

According to an embodiment of the present invention, as shown in FIG. 3, another servo control section 8*b*F is provided in addition to the servo control sections 8*b*X, 8*b*Y, 8*b*Z, 8*b*B and 8*b*C for the moving X-, Y-, Z-, B-, and C-axes. The servo control section 8*b*F is connected with neither a servomotor for driving a moving axis of the machine tool nor position/speed detecting means attached to the servomotor. "F" in symbol 8*b*F for this servo control section does not represent any one of the moving axes of the machine tool, but represents a "free" condition where only one of moving axes of the machine tool is not controlled.

The addition of the servo control section 8*b*F enables the numerical controller 8 to recognize a simple increase of the number of control axes by one. The added servo control section 8*b*F is provided with the amplifier 94 as the other servo control sections 8*b*X to 8*b*C for controlling the moving axes of the machine tool. Since no servomotor is connected to the servo control section 8*b*F, parameters and control software are changed so that the numerical controller 8 can normally count the position detection signals by using a follow-up function with the servo control section 8*b*F put in servo-off state.

Further, the servo control section 8bF is connected with the on-machine measuring device 1 in place of a servomotor. The measurement signal from the on-machine measuring device 1 is input to the control section 8bF through transfer means (not shown) for control data transmission and reception included in the amplifier 94 that is connected to the control section 8bF. Thus, no axial position detection signal from the position detector 96 incorporated in any servomotor 95 is input to the servo control section 8bF. The amplifier 94 connected to the servo control section 8bF is provided with transfer means for data transmission and reception in the same manner as in the prior art case.

FIG. 4A is a block diagram illustrating an interface used according to the present embodiment of the invention. An amplifier unit 9 includes the amplifier 94, which drives the servomotor 95, and transfer means (not shown) for data transmission and reception. The transfer means constitutes the interface and is used as a means for transmitting an axial position detection signal from the position detector 96 incorporated in the servomotor 95 which is controlled by the servo control section 8b of the numerical controller 8, to the numerical controller 8.

Further, the amplifier unit 9 is provided with an A/D converter 2a and an interpolating divider 2b. The converter 2a and the divider 2b, along with the transfer means, constitute the interface 2. An analog signal output from the position detector 96 that detects position information for the servomotor 95 is input to the A/D converter 2a. The A/D converter 2a converts the analog signal from the position detector 96 into a digital signal and outputs the digital signal to the interpolating divider 2b. For example, processing in the A/D converter 2a converts a sine- or cosine-wave analog signal output from the position detector 96 into a digital signal. The interpolating divider 2b executes processing for calculating a position within each analog signal period (sine wave period) in response to the digital signal. The processing by the A/D converter 2a and the interpolating divider 2b is based on the prior art technique. If the signal output from the position detector 96 is a digital signal, the A/D converter 2a need not be used. Also, the interpolating divider 2b may be provided only if required.

FIG. 4B shows an amplifier unit 9 that is constructed in the same manner as the one shown in FIG. 4A but is not connected with a servomotor 95. An A/D converter 2a of the amplifier unit 9 shown in FIG. 4B is connected with the on-machine measuring device 1 which makes a measurement on the machine tool, and receives a measurement signal from the on-machine measuring device 1 as an input.

As shown in FIG. 4A, the position information for the servomotor 95 output from the position detector 96 that detects the rotational position of the servomotor 95 is input to the numerical controller 8 through the transfer means (constituting the interface 2) for data transmission to, and reception from, the amplifier unit 9. As shown in FIG. 4B, on the other hand, an analog signal output from the on-machine measuring device 1 is input to the A/D converter 2a (constituting an interface 2) of the amplifier unit 9. The A/D converter 2a converts the analog signal from the on-machine measuring device 1 into a digital signal and outputs it to an interpolating divider 2b. This interpolating divider 2b, like that shown in FIG. 4A, executes processing for calculating a position within each analog signal period (sine wave period) in response to the digital signal.

The interface 2 of FIG. 4A that transmits feedback information from the position detector 96 for detecting the positions of the moving axes of the machine tool to the numerical controller 8 has substantially the same circuit configuration as the interface 2 of FIG. 4B that inputs the measurement information from the on-machine measuring device 1 to the numerical controller 8.

Accordingly, the axial position detection signals which are feedback signals from the moving axes of the machine tool and the measurement signal from the on-machine measuring device 1 are input to the numerical controller 8 through the interfaces 2 having the same configuration. Thus, the position information for the respective moving axes and the measurement information from the on-machine measuring device 1 can be simultaneously input with ease.

According to the present embodiment of the invention, moreover, the number of servo control means (servo control sections) to be provided is at least one greater than that of the moving axes of the machine tool. Specifically, at least one servo control section 8bF that is not associated with the control of the moving axes of the machine tool is provided, and this control section 8bF is used to process the measurement signal from the on-machine measuring device 1. With this configuration, the way of measurement by the on-machine measuring device 1 is displayed on a real-time basis on a display device (not shown) of the numerical controller 8, so that an operator can visually monitor a measured shape. Further, information which is output from the on-machine measuring device 1, such as positional displacement or speed, is taken in a numerically-controlled sequence program and monitored, with the result that if an abnormal displacement occurs, a command is immediately issued by the numerically controlled sequence program so as to interrupt the measurement quickly and inform the operator of the occurrence of an abnormal displacement.

According to the present embodiment, the one additional amplifier unit 9 for drivingly controlling the moving axes of the machine tool is additionally provided as a means for inputting the measurement signal from the on-machine measuring device 1 to the numerical controller 8. This results in an increase in cost smaller than in the case of the prior art technique shown in FIG. 9 in which signals from the position detectors for the moving axes of the machine tool are branched by using the signal branching device and input to the personal computer.

Further, the interface 2 for inputting the measurement signal from the on-machine measuring device 1 to the numerical controller 8 is constructed in the same manner as the interface 2 for inputting the signals from the position detectors for the individual moving axes of the machine tool to the numerical controller 8. This also produces an effect that software for troubleshooting an entire system that is composed of the numerical controller, the on-machine measuring device, and the machine tool controlled by the numerical controller need not be substantially modified. Since every interface has the same configuration, moreover, the on-machine measuring device can be easily attached to and detached from another machine tool.

The interface 2 through which the measurement signal from the on-machine measuring device 1 to the numerical controller 8 is not limited to one in number, and two or more interfaces may be used depending on the number of on-machine measuring devices disposed in the machine tool. A spare interface may be provided without being currently used either for the input of the measurement signal from the on-machine measuring device 1 or for the input of signals from the position detectors for the individual moving axes of the machine tool. Further, a single interface may be used in common for a plurality of on-machine measuring devices by incorporating a switching device therein.

In the embodiment described above, the transfer means (constituting the interface 2) of the amplifier unit 9 is used to feed the measurement signal from the on-machine measuring device 1 to the numerical controller 8. In other words, from among functions of the amplifier 94 in the amplifier unit 9, a function which gets engaged in driving the servomotor is not used. Accordingly, only the transfer means may be removed from the amplifier unit 9 and used as an interface for the transfer of the measurement signal from the on-machine measuring device 1. If this is done, a measure (e.g., parameter setting) is taken to cause the numerical controller 8 to regard such an interface (transfer means) as an amplifier lest a servo alarm be generated.

FIG. 5 is a diagram illustrating an on-machine measuring device 1 which moves along a surface 100a to be measured so as to measure the shape of the surface 100a by the displacement of the probe 1b.

The probe 1b is supported by a hydrodynamic bearing (not shown) that is contained in a case 1a of the on-machine measuring device 1 and is movable in the direction ("probe direction of travel") indicated by an arrow in FIG. 5. The movement change of the probe 1b is detected by a laser head 1c and a linear scale 1d. Alternatively, the movement change of the probe 1b may be detected by using a high-precision measuring device, such as a laser interferometer.

In order to approximate the accuracy of the shape measurement on the on-machine measuring device 1 to the machining accuracy of the machine tool to which the on-machine measuring device 1 is attached, a mechanical section, such as a bearing structure of the on-machine measuring device 1, as well as movement change detecting means of the probe 1b for the on-machine measuring device 1, should preferably be configured in the same manner as mechanical sections such as the position detecting means for the moving axes of the machine tool and bearing structures of the moving axes.

As a tip of the probe 1b moves in a "measurement direction" shown in FIG. 5 along the surface 100a to be measured, the probe 1b moves in the "probe movement direction" of FIG. 5. The movement of the probe 1b along the surface 100a can be executed by moving the on-machine measuring device 1 while fixing the surface 100a to be measured or by moving an object 100 to be measured while fixing the on-machine measuring device 1.

As in the case of a conventional contact measuring device, the tip (contact portion) of the probe 1b is fitted with, for example, a spherical sapphire ball, which serves to reduce the coefficient of friction with the surface 100a to be measured and prevent abrasion.

FIG. 6 is a diagram illustrating the numerical controller 8 which transfers axial coordinate values to the personal computer 11.

The position information input from the position detectors for the individual moving axes of the machine tool and the position information from the on-machine measuring device 1 are loaded into the storage means (not shown) of the numerical controller 8. The position information from the position detectors for the individual moving axes of the machine tool and the position information from the on-machine measuring device 1 are captured with the same timing. These pieces of position information captured with the same timing are loaded into the storage means of the numerical controller 8.

The personal computer 11 shown in FIG. 6 requests the numerical controller 8 to transmit the axial coordinate values thereto. The axial coordinate values include the position information for the moving axes of the machine tool and the position information output from the on-machine measuring device 1. In response to the request from the personal computer 11, the numerical controller 8 reads and transfers the axial coordinate values. The position information captured by the personal computer 11 is loaded into the storage device 11a (see FIG. 2) attached to the computer 11. The storage device 11a is, for example, a hard disk or flash memory incorporated in the personal computer.

The following is an additional description of the numerical controller 8. The numerical controller 8 is mounted with a processor (CPU), DRAM, SRAM, flash memory, DSP (digital signal processor), and common RAM. Further, the numerical controller 8 is furnished with a communication LSI for communication with a servo amplifier, optical module, and Ethernet board for information transfer with the external device. The CPU can access the DRAM, SRAM, flash memory, and common RAM through a bus. Data is transferred between the CPU and DSP via the common RAM. If the CPU writes an amount of movement in the common RAM with every predetermined period, the DSP reads the movement amount from the common RAM, calculates a current command value for each motor, and transmits the command value to the servo amplifier through the common LSI and optical module.

On the other hand, current values and position information for the motors and the like are transmitted to the DSP through the optical module and communication LSI. The position information for the motors transmitted to the DSP is loaded into the SRAM. The position information stored in the SRAM is output to the external device via the Ethernet network. According to the embodiment of the present invention, the DSP is loaded with the position information from the position detectors of the motors and the position information from the on-machine measuring device. These pieces of position information stored in the SRAM are transferred to the personal computer via the Ethernet network.

Figure 7:
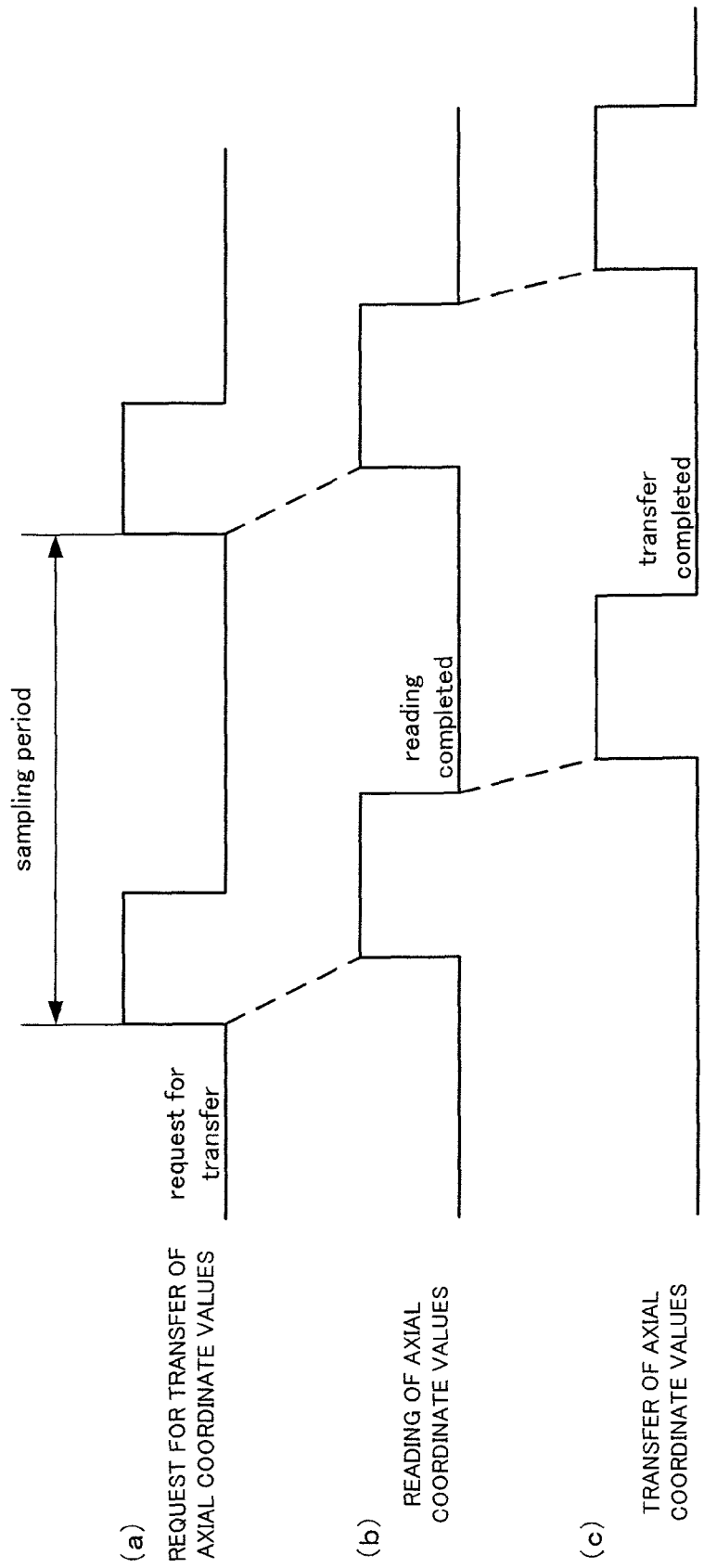
FIG. 7 is a time chart showing how axial coordinate values with predetermined sampling periods are transmitted in response to a request from the personal computer of FIG. 6 to the numerical controller for transfer.

FIG. 7 is a time chart showing how the axial coordinate values with predetermined sampling periods are transferred in response to the request from the personal computer 11 of FIG. 6 to the numerical controller 8 for transfer. The request from the computer 11 to the controller 8 for the transfer of the axial coordinate values is made with the predetermined sampling periods, and the axial coordinate values are read and transferred according to the transfer request.

Figure 8:
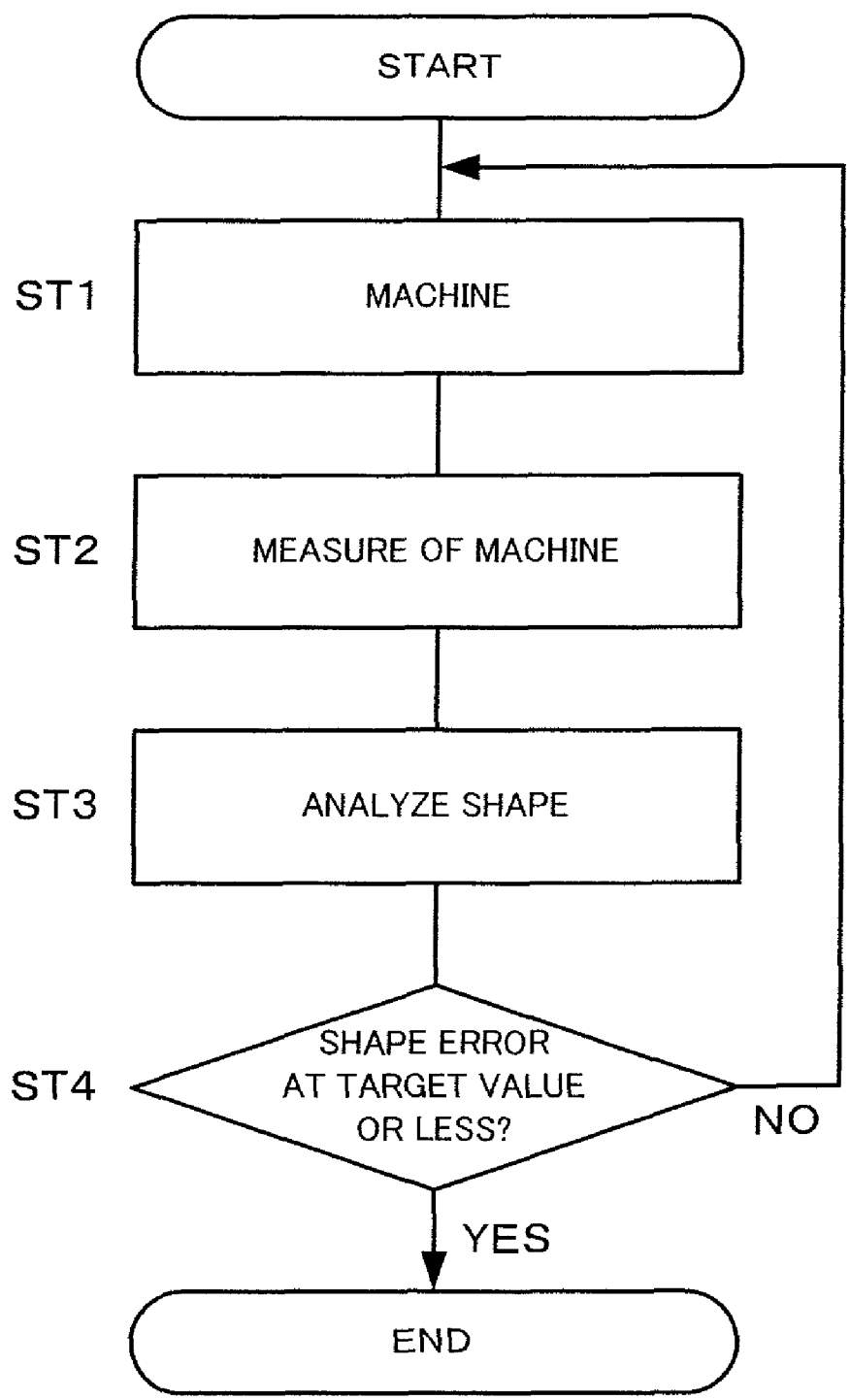
FIG. 8 is a flowchart showing an operation sequence from machining of a workpiece on the machine tool to on-machine measurement by the measuring device on the machine tool and corrective machining based on the result of the measurement.

FIG. 8 is a flowchart showing an operation sequence from machining of the workpiece on the machine tool to on-machine measurement by the measuring device on the machine tool and corrective machining based on the result of the measurement.

First, the workpiece W is machined (Step ST1), the on-machine measurement of the workpiece W is executed (Step ST2), and the shape analysis is executed (Step ST3). It is determined whether a shape error is at a target value or less as a result of the shape analysis (Step ST4). If the shape error is not at the target value or less, the processing returns to Step ST1, in which the workpiece W is machined again. If the shape error is at the target value or less, on the other hand, the processing is terminated.

What is claimed is:

1. A machine tool with a numerical controller and an on-machine measuring device, wherein
said machine tool is fitted with a position detector for detecting a position of a moving axis of the machine tool and said on-machine measuring device for measurement on the machine tool;

said numerical controller receives an axial position detection signal output from the position detector and a measurement signal output from the on-machine measuring device through interfaces;

the interfaces are designed so that the numerical controller receives the axial position detection signal and the measurement signal with the same timing; and said numerical controller includes a storage device which stores data on the axial position detection signal and the measurement signal received individually through the interfaces and a transfer device which transmits the data stored in the storage device to an external device;

wherein said interfaces are included in amplifiers for controlling motors which drive moving axes of the machine tool;

said numerical controller receives the measurement signal from the on-machine measuring device via an interface included in one of said amplifiers which is connected to none of the motors for driving the machine tool;

said interfaces comprise a first interface which is included in each of amplifiers for controlling motors for driving axes of the machine tool, and a second interface which is included in one of said amplifiers which is connected to none of the motor for driving the axes of the machine tool;

said first interface transmits the axial position detection signal output from the position detector to the numerical controller, and the second interface transmits the measurement signal output from the on-machine measuring device to the numerical controller; and the first interface and the second interface have the same configuration so that the axial position detection signal and the measurement signal are configured to simultaneously input into the numerical controller.

2. The machine tool with a numerical controller and an on-machine measuring device according to claim 1, wherein each of said interfaces includes an A/D converter which converts an analog signal output from the on-machine measuring device and the position detector into a digital signal and an interpolating divider which calculates position data within each period of the analog signal based on the digital signal output from the A/D converter and outputs digital data.

3. The machine tool with a numerical controller and an on-machine measuring device according to claim 1, wherein the numerical controller is connected to a personal computer as the external device, the numerical controller transmits the data stored in the storage device to the personal computer with every predetermined period, in response to a request, if any, for data transfer with every predetermined period, and the transmitted data is loaded into a storage device in the personal computer.

4. The machine tool with a numerical controller and an on-machine measuring device according to claim 3, wherein the personal computer includes shape analysis device which analyzes data on the measurement signal output from the on-machine measuring device, stored in the storage device in the personal computer, and calculates a shape of a workpiece set on the machine tool, and calculates shape error data indicative of the difference between the calculated shape of the workpiece and a reference shape of the workpiece, and the numerical controller performs corrective machining control to reduce the shape error when the shape error data output from the shape analysis device is not less than a target value, and repeatedly executes shape measurement and corrective machining so that the shape error data becomes less than the target value.

5. The machine tool with a numerical controller and an on-machine measuring device according to claim 1, wherein said on-machine measuring device includes therein a probe and a position detector for detecting a displacement of the probe, performs scanning with a tip of the probe in contact with an object to be measured, and measures the shape of the object to be measured by detecting the displacement of the probe.

6. The machine tool with a numerical controller and an on-machine measuring device according to claim 5, wherein said position detector for detecting a position of a moving axis of the machine tool or said position detector for detecting a displacement of the probe is a linear scale, pulse coder, or laser interferometer.

7. A machine tool with a numerical controller and an on-machine measuring device, wherein said machine tool is fitted with a position detector for detecting a position of a moving axis of the machine tool and said on-machine measuring device for measurement on the machine tool;

said numerical controller receives an axial position detection signal output from the position detector and a measurement signal output from the on-machine measuring device through interfaces;

the interfaces are designed so that the numerical controller receives the axial position detection signal and the measurement signal with the same timing;

said interfaces are included in amplifiers for controlling motors which drive moving axes of the machine tool;

said numerical controller receives the measurement signal from the on-machine measuring device via an interface included in one of said amplifiers which is connected to none of the motors for driving the machine tool;

said numerical controller includes a storage device which stores data on the axial position detection signal and the measurement signal received individually through the interfaces; further said machine tool includes a shape analysis device which calculates a shape of a workpiece set on the machine tool based on the data stored in the storage device and calculates shape error data indicative of the difference between the calculated shape of the workpiece and a reference shape of the workpiece; and said numerical controller performs corrective machining control to reduce the shape error when the shape error data output from said shape analysis device is not less than a target value, and said machine tool and said on-machine measuring device repeatedly execute shape measurement and corrective machining so that the shape error becomes less than the target value;

wherein said interfaces comprise a first interface which is included in each of amplifiers for controlling motors for driving axes of the machine tool and a second interface which is included in one of said amplifiers which is connected to none of the motor for driving the axes of the machine tool;

said first interface transmits the axial position detection signal output from the position detector to the numerical controller, and the second interface transmits the measurement signal output from the on-machine measuring device to the numerical controller; and the first interface and the second interface have the same configuration so that the axial position detection signal and the measurement signal are configured to simultaneously input into the numerical controller.

8. The machine tool with a numerical controller and an on-machine measuring device according to claim 1, wherein said numerical controller receives the measurement signal from the on-machine measuring device via an interface which causes the numerical controller to regard as an interface included in the amplifier, instead of via an interface included in one of said amplifiers which is connected to none of the motors for driving the machine tool.

* * * * *